United States Patent
Jessen et al.

(10) Patent No.: US 8,150,084 B2
(45) Date of Patent: Apr. 3, 2012

(54) HEARING AID AND A METHOD OF PROCESSING A SOUND SIGNAL IN A HEARING AID

(75) Inventors: Anders Holm Jessen, Glostrup (DK); Preben Kidmose, Målov (DK)

(73) Assignee: Widex A/S, Lynge (DK)

( * ) Notice: Subject to any disclaimer, the term of this patent is extended or adjusted under 35 U.S.C. 154(b) by 904 days.

(21) Appl. No.: 11/281,390

(22) Filed: Nov. 18, 2005

(65) Prior Publication Data

US 2006/0078141 A1  Apr. 13, 2006

Related U.S. Application Data

(63) Continuation-in-part of application No. PCT/DK03/00330, filed on May 19, 2003.

(51) Int. Cl.
 *H04R 25/00* (2006.01)
(52) U.S. Cl. ......... 381/328; 381/312; 381/380; 381/381
(58) Field of Classification Search .......... 381/380–381, 381/312–331; 379/430
 See application file for complete search history.

(56) References Cited

U.S. PATENT DOCUMENTS

| | | | |
|---|---|---|---|
| 4,073,366 A | 2/1978 | Estes | |
| 4,311,206 A * | 1/1982 | Johnson | 181/135 |
| 5,058,171 A | 10/1991 | Wolf | |
| 6,327,370 B1 * | 12/2001 | Killion et al. | 381/313 |
| 6,424,721 B1 | 7/2002 | Hohn | |
| 6,473,512 B1 * | 10/2002 | Juneau et al. | 381/328 |
| 6,539,096 B1 | 3/2003 | Sigwanz | |
| 6,882,736 B2 * | 4/2005 | Dickel et al. | 381/317 |
| 7,003,127 B1 * | 2/2006 | Sjursen et al. | 381/322 |
| 7,181,030 B2 * | 2/2007 | Rasmussen et al. | 381/312 |

FOREIGN PATENT DOCUMENTS

| | | |
|---|---|---|
| EP | 0695108 A2 | 1/1996 |
| EP | 0695108 B1 | 4/2000 |
| EP | 1 196 009 A2 | 4/2002 |
| WO | WO 02/17838 A1 | 3/2002 |

OTHER PUBLICATIONS

Chinese Office Action dated Jul. 3, 2009 for Appln. 038264981.6 with English Translation.

* cited by examiner

*Primary Examiner* — Davetta W Goins
*Assistant Examiner* — Matthew Eason
(74) *Attorney, Agent, or Firm* — Sughrue Mion, PLLC

(57) ABSTRACT

A hearing aid (1) includes a housing (2), at least a first microphone for receiving ambient sound, processing circuitry for processing a signal from the first microphone (6, 7) and an output transducer. At least one further microphone (8) is disposed in the hearing housing at a location, which, during normal use of the hearing aid, is sheltered against wind influences.

23 Claims, 2 Drawing Sheets

HEARING AID AND A METHOD OF PROCESSING A SOUND SIGNAL IN A HEARING AID

RELATED APPLICATIONS

The present application is a continuation-in-part of application No. PCT/DK2003/000330, filed on May 19, 2003, in Denmark and published as WO2004/103020 A1.

BACKGROUND OF THE INVENTION

1. Field of the Invention

The present invention generally relates to hearing aids. The invention, more specifically relates to hearing aids and to methods of acquiring and processing sound signals in hearing aids. The invention, still more specifically, relates to a hearing aid comprising a housing, and at least a first and a second microphone for receiving ambient sound.

2. The Prior Art

It is a known problem that transducers, such as microphones, in electronic devices give rise to problems with wind noise.

In hearing aids there are two prime sources of this wind noise. One is the direct influence of the wind on the membrane of the transducer. Another is acoustic noise from turbulence around the head, the outer ear, and the housing of the hearing aid itself.

In an ear with normal hearing the first source is not very pronounced because the membrane, i.e. the eardrum, is buried deep in the inner ear at the end of the ear canal.

This is not the case in hearing aids. Conversely, in hearing aids the transducers are, for various reasons such as frequency characteristics, sound pressure sensitivity, directional phase characteristics etc., mounted as far in the open as possible in the attempt to achieve an optimum acoustic response of the transducer.

In many cases the wind influence directly on the membrane results in so large signals from the transducer to the signal processing circuitry in the hearing aid that saturation occurs. When parts of the processing circuitry such as analogue/digital converters (ADCs) in a digital hearing aid, amplifier stages in an analogue hearing aid or even the microphones themselves saturate, the output signal produced by the hearing aid will be impaired.

Attempts have been made to reduce the problems with wind noises in hearing aids.

US-A-2002/0037088 refers to several prior art attempts, and states inter alia that in order to reduce wind noise it is known to fit the microphone openings so as to protect them from the wind as much as possible. This is however generally incompatible with the desire of having the microphones mounted as far in the open as possible. In particular, the direction sensitivity, which is achieved by using two or more microphones at predetermined locations on a hearing aid, would suffer if the microphones were not in the open. Moreover, US-A-2002/0037088, does not elaborate on how to protect these openings, as it takes another approach to overcoming wind noises than external measures.

U.S. Pat. No. 3,875,349 provides a hearing aid possessing a first microphone having spherical sensitivity characteristics and a second microphone with directional sensitivity characteristics, and a switch for switching the amplifier selectively to either one or both microphones. The switch may be automatically controlled depending on the signal. This document seeks to resolve different listening situations and does not deal with wind influences.

U.S. Pat. No. 5,201,006 shows a hearing aid with a primary and a secondary microphone.

The primary microphone serves to provide the signal to be amplified. The secondary microphone is provided for feedback compensation purposes and is adapted to receive sound through a secondary duct, said sound mainly originating from parts of the shell between the shaped portion and the wall of the auditory meatus. As the purpose is feedback compensation, the secondary microphones are not intended to receive any ambient sounds.

SUMMARY OF THE INVENTION

It is the object of the present invention to provide a hearing aid and a method of acquiring and processing sound, which overcomes the above problems.

According to the invention, in a first aspect, this object is achieved by a hearing aid comprising a housing, a first microphone for receiving ambient sound, a second microphone for receiving ambient sound, processing means for processing a signal from at least one of the first and the second microphone, and an output transducer, wherein said housing has a faceplate and a shell portion, the shell portion being adapted for partial insertion in the ear canal of a user, and wherein said second microphone has a sound port located at a surface of said shell portion at a location that is, during normal use of the hearing aid, sheltered against wind influences.

The second microphone disposed at a location, which, during normal use of the hearing aid, is sheltered against wind influences, can be used under circumstances, where the main microphone or microphones of the hearing aid are disturbed by wind influence.

The invention, in a second aspect, provides a hearing aid comprising a housing, a first microphone for receiving ambient sound, a second microphone for receiving ambient sound, processing means for processing a signal from at least one of the first and the second microphone, and an output transducer, wherein said housing has a concave surface adapted for wearing behind the ear of a user, and wherein said second microphone is disposed on said concave surface.

Having the microphone located in this position allows it to lie in the gap between the ear and the housing during use, whereby it is protected from the wind.

Having the microphone located within the housing also allows for a further preferred embodiment wherein the hearing aid comprises an electronics module and said second microphone is located on the electronics module. This has the advantage that no wires need to be drawn from the electronics module to the second microphone, thus obviating the need for the delicate work of drawing the wires, which is generally performed manually.

According to a further embodiment said second microphone comprises a port in the surface of the housing and a canal from the port to an electronic part of the microphone within that housing. By the use of a canal the wind noise is damped. The use of a canal provides further design options, such as special shapes for tuning the wind noise influence on the microphone.

Preferably, according to still a further embodiment, said canal has an inlet in said surface of the housing and said inlet is positioned so in said surface that it lies essentially in the transition between the concha and the ear canal, when said hearing aid is positioned in the ear for which the hearing aid is adapted. By having the inlet of the canal at this place, which is as deep as practically possible in the ear, the ear itself aids in protecting the second microphone from the wind.

According to another preferred embodiment the lower cut-off frequency of said second microphone is substantially higher than the lower cut-off frequency of said at least one first microphone. This is advantageous as the majority of the energy in the noise spectrum from wind noises is found in and below the low frequency part of the audible spectrum. Saturation caused by the signal from this microphone will thus occur at a higher level than the saturation caused by the signal(s) from the main microphone(s). Saturation caused by these can thus be used to indicate the presence of wind noise.

Preferably the cut off-frequency of said second microphone is above approximately 1 kHz. The cut-off frequencies for the main microphones in modern hearing aids may be as low as 20 Hz. The sensitivity of the further microphone will thus, depending on the frequency of course, be several dB lower for frequencies below 1 kHz.

According to yet another embodiment the hearing aid comprises means for detecting saturation of the amplification circuitry and disabling said at least one first microphone in case saturation has been detected. Such detection could then be used to switch to the second microphone.

The invention, in a third aspect, provides a method of acquiring and processing a sound signal in a hearing aid, comprising acquiring a first sound signal through a first microphone opening placed in the hearing aid at a first position, which is selected for good acoustic rendering on conditions not exposed to wind, acquiring a second sound signal through a second microphone opening placed in the hearing aid at a second position, which is selected to be, during normal use, at least partially sheltered against direct wind exposure, detecting the conditions of wind exposure by analysis of at least one of the first and the second sound signals, selecting for processing on conditions not exposed to wind mainly the first sound signal, and selecting for processing on conditions exposed to wind mainly the second sound signal.

Hereby is achieved that good rendering is maintained under conditions where the first microphone is not subjected to wind influences.

According to an embodiment of the method, it comprises selecting for the first microphone a directional microphone.

Hereby is achieved that the directional sensitivity is maintained under conditions where the main microphone is not subjected to wind influences.

According to a second embodiment the method comprises selecting for the second microphone a microphone with less sensitivity to low frequencies than is the case with the first microphone.

Hereby is achieved that the hearing aid is even less prone to wind influences, because the second microphone or the circuit connected thereto will saturate later than the first microphone.

According to a different embodiment the method comprises customizing the hearing aid to adapt it to the auditory meatus of an individual user.

Hereby it is achieved that the second microphone is protected in the best possible way against wind influences.

According to another embodiment of the invention the method comprises flaring the second microphone opening to reduce any turbulence by crosswind.

The invention, in a fourth aspect, provides a method of acquiring and processing a sound signal in a hearing aid, comprising acquiring a first sound signal through a first microphone opening placed in the hearing aid at a first position, which is selected for good acoustic rendering on conditions not exposed to wind, acquiring a second sound signal through a second microphone opening placed in the hearing aid at a second position, which is selected to be, during normal use, recessed to a position essentially in the transition between the concha and the ear canal, in order to be at least partially sheltered against direct wind exposure, detecting the conditions of wind exposure by analysis of level of noise of at least one of the first and the second sound signals, selecting for processing on conditions not exposed to wind mainly the first sound signal, and selecting for processing on conditions exposed to wind mainly the second sound signal.

Further features and embodiments will appear from the detailed part of the specification.

BRIEF DESCRIPTION OF THE DRAWINGS

For better understanding of the invention a detailed description will be given based on non-limiting exemplary embodiments illustrated in the figures, where.

DETAILED DESCRIPTION OF THE INVENTION

Figure 1:
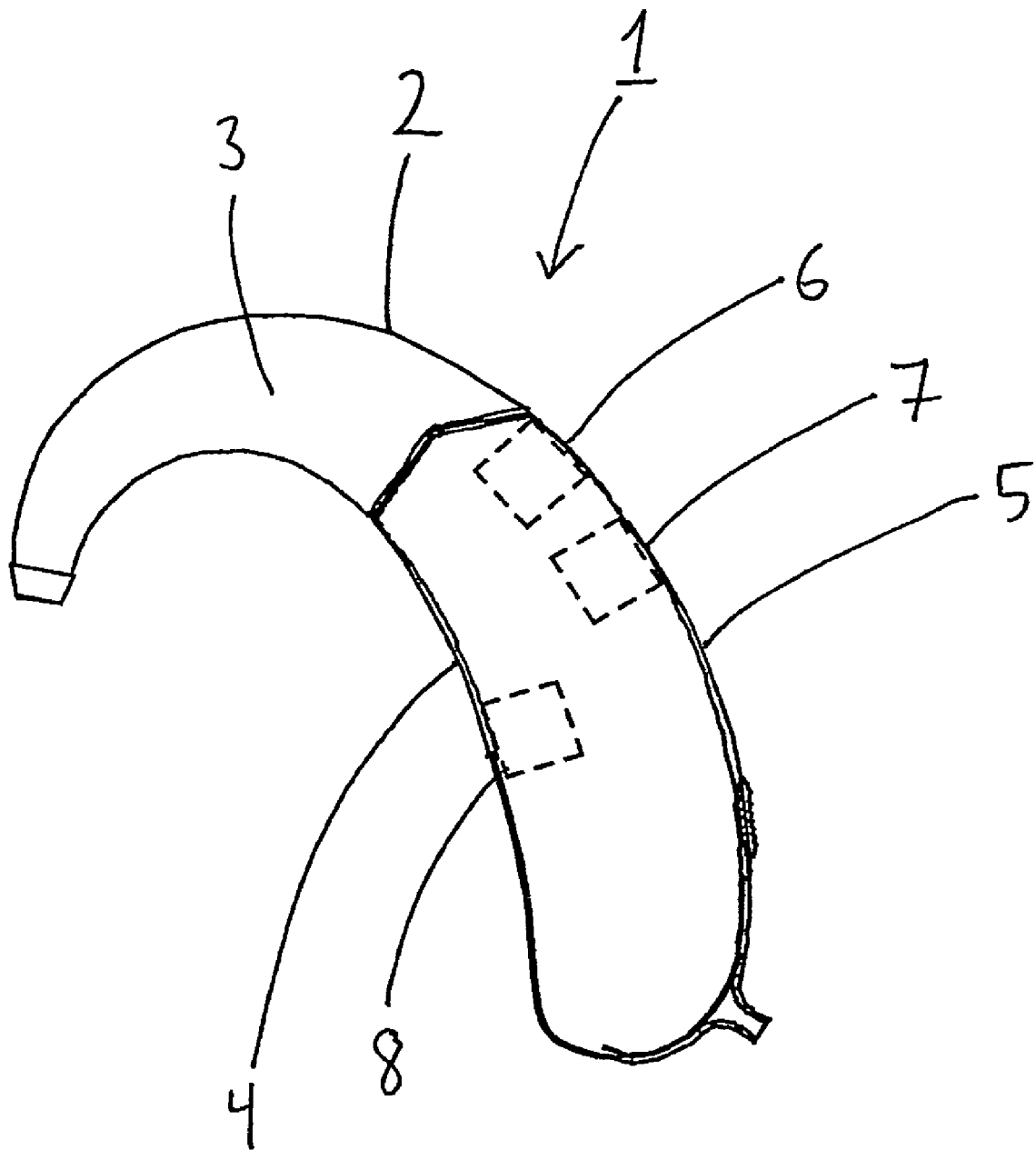
FIG. 1 is a schematic side view, partially in section, illustrating typical positions of the microphones in a BTE hearing aid (BTE=behind-the-ear)

In FIG. 1 a BTE hearing aid 1 is illustrated. The hearing aid comprises a housing 2. The housing 2 essentially comprises four sides, viz. two substantially flat parallel sides 3 and two curved sides, where the curved sides comprise a convex side 5 and a concave side 4. During use, the substantially flat sides 3 are located between the pinna and the head. The convex side 5 is exposed behind the ear, and the concave surface 4 faces the transition between the outer ear and the head.

A front microphone 6 and a rear microphone 7 are located on the convex surface 5. In the following the front microphone 6 and the rear microphone 7 will generally be referred to as main microphones. In this respect it should be noted that hearing aids without direction sensitivity could have only one main microphone. The two main microphones 6 and 7 are spaced apart for obtaining direction sensitivity of the hearing aid 1.

As already mentioned, the main microphones 6 and 7 are placed as far in the open as possible in order to obtain good characteristic. They are thus highly subjected to wind influences, and hence to wind-related noise.

A further microphone 8 is located on the concave surface 4 of the hearing aid. During use, i.e. when the hearing aid 1 is placed behind the ear of the wearer, a cavity is formed by the pinna, the head, the transition between these, and the concave surface 4 of the hearing aid housing. The further microphone 8 faces this cavity and is thus well protected from direct wind influences. In order to further suppress wind influences, the microphone opening of the second microphone 8 in the housing 2 may be flared (not shown).

Experiments have shown that even though the frequency characteristics of the further microphone 8 may be inferior to the frequency characteristics of the main microphones it is still acceptable, in particular when considering the alternative of a signal from the main microphones 6 and 7 that is influenced by wind noise or distorted, e.g. due to saturation.

Figure 2:
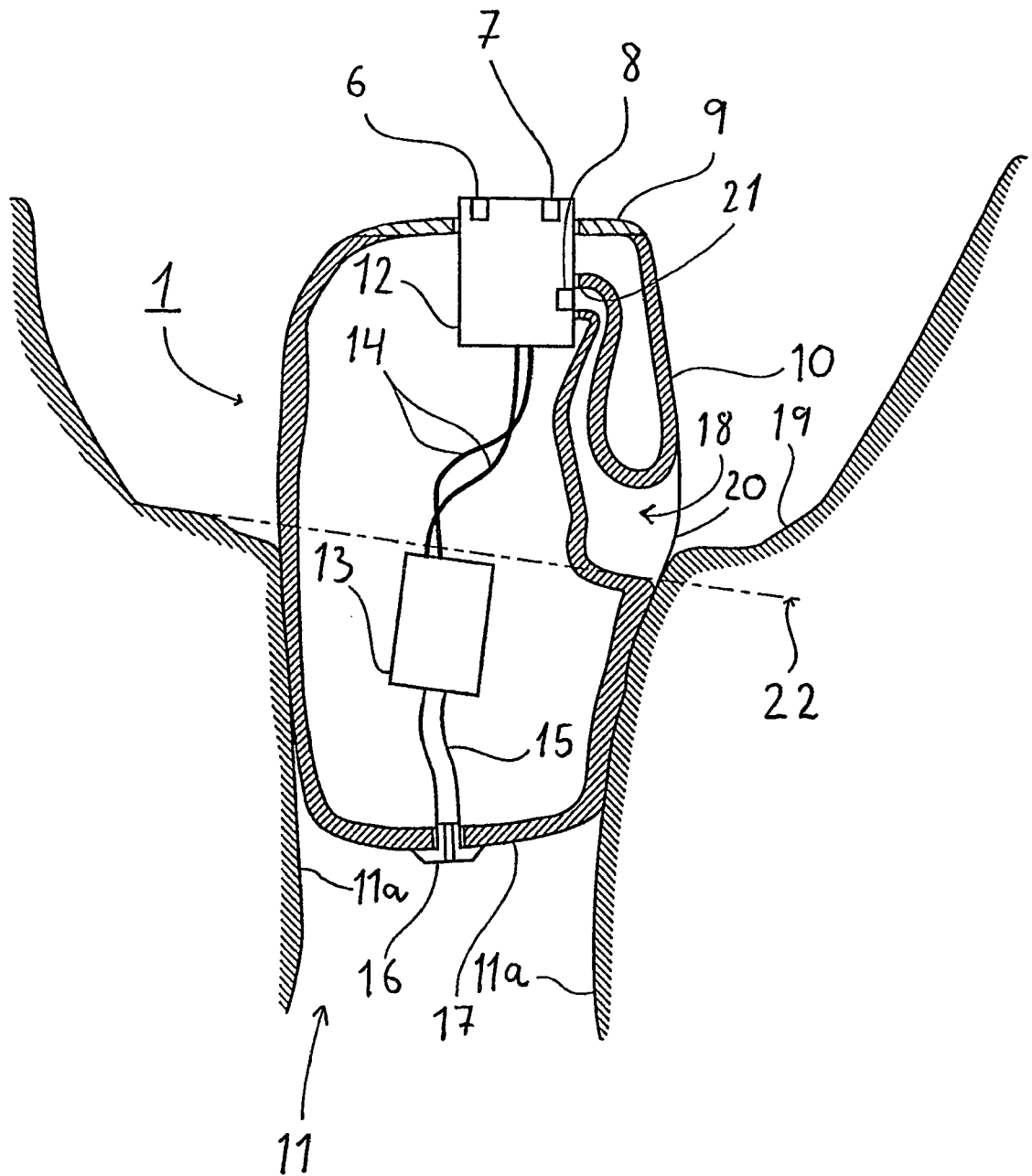
FIG. 2 is a partial cross section schematically illustrating typical positions of the microphones in an ITE hearing aid (ITE=in-the-ear).

FIG. 2 illustrates another embodiment of the invention. In the description of this embodiment the same reference numerals as in FIG. 1 have been used for the same or corresponding features.

The hearing aid in FIG. 2 has an ITE housing comprising an upper faceplate 9 and a hollow shell part 10 adapted for partial insertion into the ear canal 11 of the wearer where it is held against the ear canal wall 1 1a. Typically the faceplate 9 is a standard item comprising an electronics module 12, whereas the hollow shell part 10 is manufactured individually to the user. Methods for the manufacturing of custom shells, e.g. by casting, are well known in the field. In a preferred embodiment, the shell part is manufactured by means of Computer Aided Manufacturing using a 3D-printing method, in the following referred to as CAMISHA®. This method is described in WO-A-02/078233 and in U.S. Pat. No. 5,487, 012.

The main microphones 6 and 7 are mounted in the electronics module 12, which protrudes slightly from the faceplate 9. Preferably, the electronics module 12 also contains all the necessary signal processing circuitry, except the output transducer 13.

The output transducer 13 is located separately in the hearing aid housing and connected to the electronics module 12 by means of flexible leads 14. The sound is emitted from the output transducer 13 through a transducer outlet tube 15 ending in a transducer outlet plug 16 in the bottom 17 wall of the hollow shell part 10 facing the inner part of the ear canal.

In the embodiment of FIG. 2 the electronics module 12 furthermore comprises a further microphone 8. The further microphone 8 is located on a part of the electronics module 12 spaced from the faceplate and not facing the exterior. That is to say, the further microphone comprises an electronic part located on a part of the electronics module 12, which, in the assembled hearing aid 1, faces the cavity in the interior of the hearing aid 1. In the illustrated embodiment the hearing aid housing comprises a canal 18 from inlet 20 in the surface of shell part 10 to the further microphone 8 within the housing. Hereby the effective sound port of the further microphone is located at the shell surface while the electronic part of the further microphone is located in the electronics module.

The canal 18 is preferably integrally formed with the shell part of the hearing aid housing. In a CAMISHA® manufacturing method, a computer model of the auditory canal is established. In an interactive optimising procedure, an operator selects the electronics module and decides the optimum location and orientation of the electronics module, as well as of the shell in the canal. The shell will then be printed tailored so as to contact parts of the sides of the auditory canal. However, an outer part of the shell will not contact the auditory canal. It is a part of the customizing to decide which part will contact the canal and to establish the demarcation line to the outer shell part.

Because the CAMISHA® shell part 10 of the housing of the hearing aid 1 is individually manufactured, it is possible to locate the inlet 20 of the canal 18 just outside the demarcation line 22 in such a way in the shell part 10 of the housing that it is just exposed, when the hearing aid is inserted to the wearing position in the ear canal 11. Thereby it is achieved that the inlet 20 of the canal 18 is located as deeply as possible in the ear without the ear canal wall 1 1a blocking the inlet 20. The demarcation line, demarcating the contacting portion form the non-contacting shell portion is illustrated with the dash-dot line 22 in FIG. 2. The recessed location of the inlet 20 achieves sheltering against direct wind exposure by the housing in combination with the head and the pinna of the hearing aid user. Preferably the inlet 20 forming the outer microphone opening is flared, as can be seen in FIG. 2.

The other end of the canal 18 ends in an outlet 21 at a position in the hearing aid corresponding to the position of the further microphone 8. Because the further microphone 8 is located on the electronics module 12 it has a well-defined position with respect to the faceplate 9. This allows the canal 18 to be integrally formed with the CAMISHA® shell part 10 during the individualized computer aided manufacturing.

Thus, by the use of the CAMISHA® shell part 10 it is possible to locate the canal 18 optimally with respect to the positions of its inlet 20 and outlet 21. That is to say, to have the inlet 20 retracted or recessed as deeply as possible in the ear, where least wind influences are present, and to have the outlet 21 arranged to feed the sound into the further microphone 8, which is placed on the electronics module 12, obviating the need for further wires to be drawn. In the preferred embodiment, the inlet 20 to the microphone is flared. Flaring the inlet reduces the noise input into the canal by any crosswind.

Though the present invention has in the above been embodied in ITE and BTE hearing aids only, the skilled person would realise that it would also in a CIC hearing aid (CIC=completely in the canal) be possible to arrange a further microphone within the housing with a canal leading to it.

Evidently, only little useful directional information can be obtained from the retracted microphone 8. Switching directly to the further microphone 8 alone, when wind noise or saturation is detected, would therefore entail the sacrifice of directional information. However, most of the noise energy from the wind-generated noises is low frequent. Accordingly, in one embodiment high pass filtering is used to extract high frequency information from the main microphones 6 and 7 and low pass filtering to extract the low frequency information without wind noise from the further microphone 8. This may be achieved in several ways e.g. by introduction of fixed high and low pass filters upon detection of saturation, or by smooth switching. This then allows suppression of wind noise from the main microphones 6 and 7, while maintaining at least some degree of directional sensitivity. In other embodiments, the signals from the respective microphones can be combined or balanced according to a weighting factor, selected according to the prevailing conditions.

Depending on the type of hearing aid, various criteria for detection of wind noise exist. One is low frequency comparison between the signals from the further microphone 8 and the main microphones 6 and 7. Another is detection of saturation of the analogue/digital converter. Typically in wind noise conditions the slew rate could be detected, as the signal would erratically switch from full positive signal to full negative signal and vice versa. Still another criterion could be the detection of the low-frequency part of the signal from the main microphone exceeding a predetermined threshold. Yet another criterion could be the level of uncorrelated noise in the dual microphone parts of a directional microphone exceeding a predetermined threshold.

Since most of the signal energy of the wind noise is low frequent it is advantageous to have a different cut-off frequency for the further microphone, as compared to the main microphones 6 and 7, which themselves preferably are matched to each other. This allows the further microphone to saturate much later than the main microphones, even if they were to be exposed to the same noise.

We claim:

1. A hearing aid comprising a housing, a first microphone for receiving ambient sound, a second microphone for receiving ambient sound, processing means for processing a signal from at least one of the first and the second microphone, and an output transducer, wherein said housing has a faceplate and a shell portion, the shell portion being adapted for partial insertion in the ear canal of a user, and wherein said hearing aid is customized to adapt it to the auditory meatus of said user such that said second microphone has a sound port located at a surface of said shell portion at a location that is, during normal use of the hearing aid, sheltered against wind influences, wherein said port is positioned essentially at the transition between the concha and the ear canal, when said hearing aid is positioned in the intended normal use position.

2. The hearing aid according to claim 1, wherein said processing means is adapted for detecting conditions of wind exposure by analysis of a sound signal from at least one of the first and the second microphones, for selecting for processing on conditions not exposed to wind mainly the signal from the first microphone, and for selecting for processing on conditions exposed to wind mainly the signal from the second microphone.

3. The hearing aid according to claim 1, wherein said processing means comprises an electronics module, and wherein said second microphone is located on said electronics module.

4. The hearing aid according to claim 1, wherein said second microphone comprises an electronic part and a canal from said sound port to said electronic part.

5. The hearing aid according to claim 1, wherein the lower cut-off frequency of said second microphone is substantially higher than the lower cut-off frequency of said first microphone.

6. The hearing aid according to claim 1, wherein the cut off-frequency of said second microphone is above approximately 1 kHz.

7. The hearing aid according to claim 2, wherein the processing means comprises amplification circuitry, and wherein the processing means is adapted for detecting conditions of wind exposure by detecting saturation of the amplification circuitry.

8. A behind-the-ear type hearing aid comprising a housing with curved sides including a convex side and a concave side, at least a first microphone for receiving ambient sound, a second microphone for receiving ambient sound, processing means for processing a signal from at least one of the first and the second microphone, and an output transducer, wherein
    a first microphone opening for said first microphone is formed on the convex side of the hearing aid housing, and
    a second microphone opening for said second microphone is disposed on said concave side of said hearing aid housing so as to shelter against wind influences by the housing in combination with the head and the pinna of the hearing aid user.

9. A method of acquiring and processing a sound signal in a hearing aid having a housing with curved sides including a convex side and a concave side, the method comprising acquiring a first sound signal through a first microphone opening formed on the convex side of the hearing aid housing, acquiring a second sound signal through a second microphone opening formed on the concave side of said housing so as to be sheltered against wind influences by the housing in combination with the head and pinna of the hearing aid user, detecting the conditions of wind exposure by analysis of at least one of the first and the second sound signals, said analysis comprising detection of the low frequency part of the signal from the first microphone exceeding a predetermined threshold, selecting for processing on conditions not exposed to wind mainly the first sound signal, and selecting for processing on conditions exposed to wind mainly the second sound signal.

10. The method according to claim 9, comprising acquiring the first sound signal by a directional microphone.

11. The method according to claim 9, comprising acquiring the second sound signal by a microphone with less sensitivity to low frequencies than is the case with the first microphone.

12. The method according to claim 9, comprising customizing the hearing aid to adapt it to the auditory meatus of an individual user.

13. The method according to claim 9, comprising flaring the second microphone port to reduce any turbulence by cross-wind.

14. The method according to claim 9, wherein said analysis further comprises low frequency comparison between the first and second sound signals.

15. The method according to claim 9, wherein said analysis further comprises detection of saturation by the signal of an analogue/digital converter.

16. The method according to claim 9, wherein said analysis further comprises detection of the slew rate of at least one of the first and the second sound signals.

17. A method of acquiring and processing a sound signal in a hearing aid comprising a housing having a faceplate and also having a shell portion adapted for partial insertion in the ear canal of the hearing aid user, said method comprising:
    acquiring a first sound signal by a directional microphone through a first microphone opening placed in the hearing aid at a first position, which is selected for good acoustic rendering on conditions not exposed to wind,
    acquiring a second sound signal through a second microphone opening placed in the hearing aid at a second position, wherein said hearing aid is customized to adapt it to the auditory meatus of said user such that said second position is on a surface of said shell portion at a location that is, during normal use of the hearing aid, sheltered against wind influences, wherein said second position is essentially at the transition between the concha and the ear canal, when said hearing aid is positioned in the intended normal use position,
    detecting the conditions of wind exposure by analysis of at least one of the first and the second sound signals,
    selecting for processing on conditions not exposed to wind mainly the first sound signal, and
    selecting for processing on conditions exposed to wind mainly the second sound signal,
    wherein the first sound signal comprises a dual signal from two parts of said directional microphone, and
    wherein the analysis of at least one of the first and the second sound signals comprises detection of the level of uncorrelated noise in the dual signal exceeding a predetermined threshold.

18. A method of acquiring and processing a sound signal in a hearing aid comprising a housing having a faceplate and also having a shell portion adapted for partial insertion in the ear canal of the hearing aid user, said method comprising:
    acquiring a first sound signal through a first microphone opening placed in the hearing aid at a first position, which is selected for good acoustic rendering on conditions not exposed to wind,
    acquiring a second sound signal through a second microphone opening placed in the hearing aid at a second position, wherein said hearing aid is customized to adapt it to the auditory meatus of said user such that said second position is on a surface of said shell portion at a location that is, during normal use of the hearing aid, sheltered against wind influences, wherein said second position is essentially at the transition between the concha and the ear canal, when said hearing aid is positioned in an intended normal use position, detecting the conditions of wind exposure by analysis of a level of noise of at least one of the first and the second sound signals, selecting for processing on conditions not exposed to wind mainly the first sound signal, and selecting for processing on conditions exposed to wind mainly the second sound signal, wherein said analysis of the level of noise of at least one of the first and second sound signals comprises at least one of a low frequency comparison between the signals from the first microphone and the second microphone, and a slew rate detection.

19. The hearing aid according to claim 1, wherein the hearing aid comprises an electronics module and said second microphone is located on said electronics module.

20. The method according to claim 9 wherein the hearing aid comprises an electronics module and said second microphone is located on the electronics module.

21. A hearing aid according to claim 1, wherein said second microphone comprises a port in the surface of the housing and a canal from the port to an electronic part of the microphone within that housing.

22. A method according to claim 9, wherein said second microphone comprises a port in the surface of the housing and a canal from the port to an electronic part of the microphone within that housing.

23. A method of fabricating a hearing aid having a housing, a first microphone for receiving ambient sound, a second microphone for receiving ambient sound, processing means for processing a signal from at least one of the first and the second microphone, and an output transducer, wherein said housing has a faceplate and a shell portion, the shell portion being adapted for partial insertion in the ear canal of a user, said method comprising customizing said hearing aid to adapt it to the auditory meatus of said user such that said second microphone has a sound port located at a surface of said shell portion at a location that is, during normal use of the hearing aid, sheltered against wind influences, so that said port is positioned essentially at the transition between the concha and the ear canal, when said hearing aid is positioned in the intended normal use position.

* * * * *